(No Model.) 2 Sheets—Sheet 1.
M. E. REISERT.
AUTOMATIC WEIGHING APPARATUS.
No. 585,785. Patented July 6, 1897.
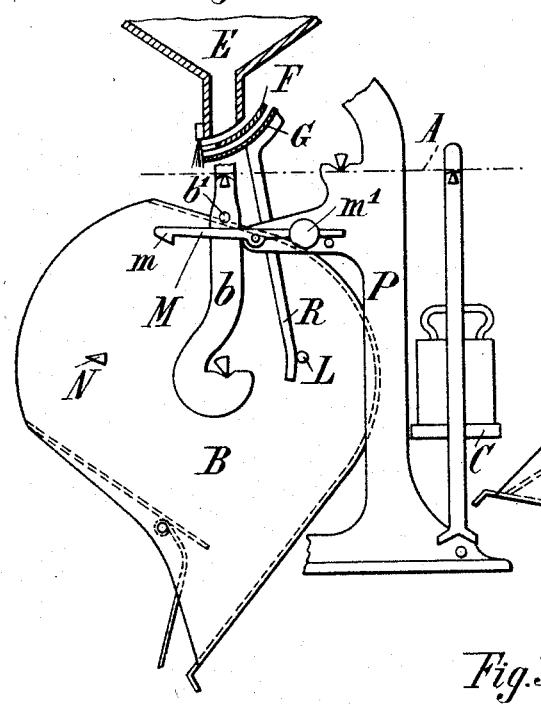
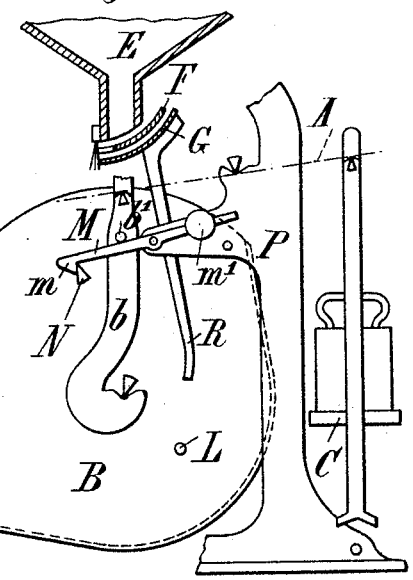
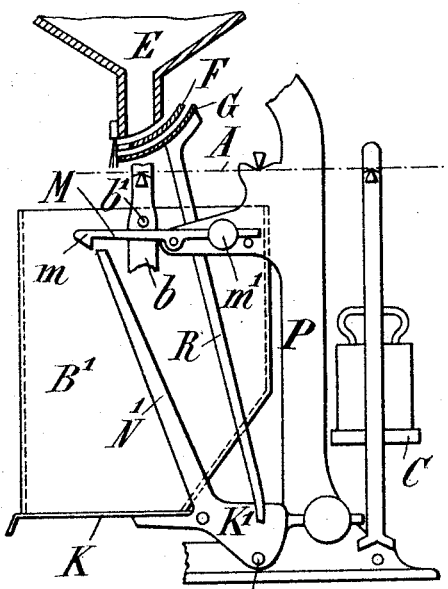
Witnesses
H. G. Dieterich
Henry Orth
Inventor
Michael E. Reisert
by Henry Orth
Atty (No Model.) 2 Sheets—Sheet 2.
M. E. REISERT.
AUTOMATIC WEIGHING APPARATUS.
No. 585,785. Patented July 6, 1897.
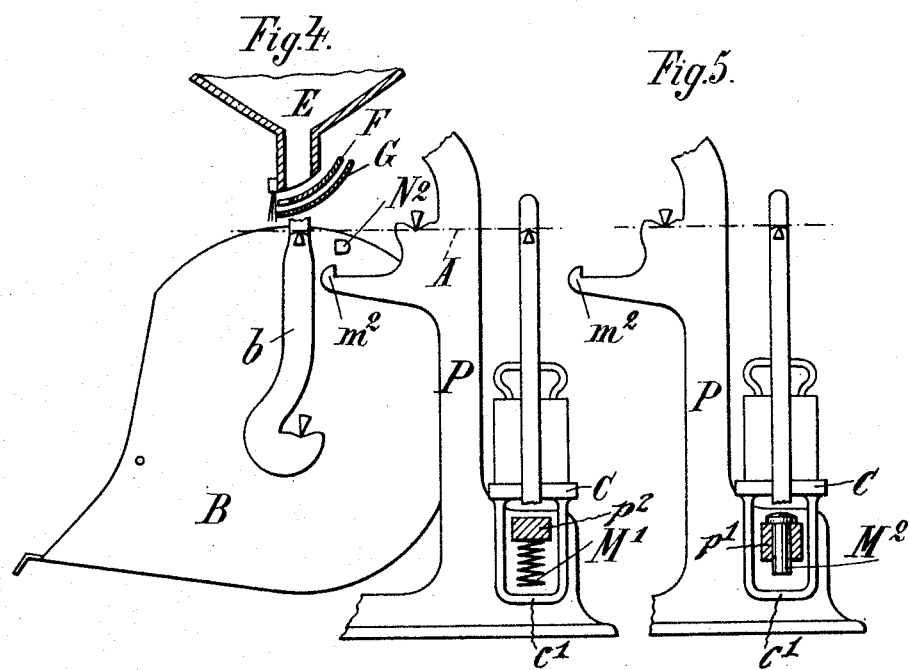
Witnesses
Inventor
Michael E. Reisert

UNITED STATES PATENT OFFICE.

MICHAEL EDUARD REISERT, OF HENNEF, GERMANY.

AUTOMATIC WEIGHING APPARATUS.

SPECIFICATION forming part of Letters Patent No. 585,785, dated July 6, 1897.

Application filed February 20, 1894. Serial No. 500,866. (No model.)

*To all whom it may concern:*

Be it known that I, MICHAEL EDUARD REISERT, a subject of the German Emperor, residing at Hennef-on-the-Sieg, in the Kingdom of Prussia, in the German Empire, have invented certain new and useful Improvements in Automatic Weighing Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation generally to that class of scales in which the pan or receiver for the material to be weighed is automatically emptied whenever the weight of the contents thereof is equal to the weight on the scale-beam, and particularly to scales such as shown, for instance, in Letters Patent of the United States granted to me July 18, 1882, No. 261,257; July 31, 1883, No. 282,226; August 4, 1885, No. 323,533; January 17, 1888, No. 376,679, and January 24, 1888, No. 376,965.

In apparatus of the class under consideration means are usually provided to guard against the fraudulent overcharging of the receiver by housing the scales; yet it has been found that the gate or gates that control the delivery of the material from the hopper to said receiver have been so tampered with as to admit a greater quantity of such material to the receiver than is warranted by the weight to be balanced by said receiver and its contents.

This invention has for its object the provision of simple means whereby an overcharged receiver is prevented from tilting and discharging its contents or whereby the discharge-gate of a non-tilting receiver is prevented from opening under the load in the receiver to discharge the same.

The invention has for its further object the provision of means whereby the oscillations of the scale-beam are stopped as soon as the load in the receiver balances the weight on the scale-beam and the receiver is about to tilt under its load, the stopping device being of such a nature as not to prevent the receiver from further downward movement under a greater load than the normal or correct load and to be locked against tilting.

In the accompanying drawings, Figure 1 is a fragmentary side elevation of scales or weighing apparatus, illustrating means for locking the receiver against tilting under a greater load than the normal or correct load, the receiver being shown in its tilted or discharging position. Fig. 2 is a like view showing the receiver locked against tilting when the load therein is greater than the normal or correct load. Fig. 3 is a similar view showing the locking devices applied to a non-tilting receiver, and Figs. 4 and 5 are likewise fragmentary side elevations illustrating means for stopping the oscillations of the scale-beam when the load in the receiver balances the load on the opposite end of the scale-beam.

Referring to Figs. 1 and 2, which illustrate a weighing apparatus embodying principles of operation such as shown and described in my Letters Patent above referred to, E indicates the feed hopper or chute, and F and G the feed-controlling gates, which may be operated from or their operation controlled by the receiver in any well-known manner and means or by means such as shown and described in my Letters Patent referred to. The receiver B is a tilting receiver—that is to say, it tilts over automatically when charged, to empty its contents, and is self-righting. It may be locked against tilting during the charging and automatically released by any well-known means—such, for instance, as shown in my aforementioned patents—and as this mechanism as well as the gate-operating mechanism are well known I have deemed it unnecessary to describe or illustrate the same, especially as the latter would tend to render the drawings more or less confusing; and to prevent further confusion I have indicated the scale-beam in all the figures of drawings by a dot-and-dash line.

M indicates a two-armed or centrally-pivoted lever fulcrumed to an arm projecting from the frame P of the scales, said lever having at the outer end of one of its arms a hook or catch $m$, adapted to engage a lug N on the receiver B, while the other lever-arm carries a weight $m'$, that is adjustably held thereon.

One of the hangers $b$ of the receiver B has a stud $b'$ in the path of the hook-arm of lever M and engages and depresses said arm against the stress of the weight $m'$ whenever the receiver B descends beyond a normal point, whereby the hook on said lever-arm is brought into engagement with the above-mentioned lug N on the receiver B and locks the same against tilting.

Inasmuch as the weight $m'$ is adjustable on lever M and inasmuch as the power exerted on said lever by said weight when the latter is adjusted to a given position is constant, the weight can be adjusted to hold the hook-arm of the lever in any desired position relatively to the stud $b'$ on hanger $b$.

In practice the relative location of the stud $b'$ and lug N and the adjustment of the weight $m'$ on lever M will be such that said lug $b'$ will bear on the hook-arm of lever M when the scale-beam A lies in a horizontal plane—that is to say, when the load in the receiver B balances the load on the weight-pan C, and that as soon as the scale-beam A assumes a downwardly-inclined position under a greater load in the receiver than is necessary to balance the weight on the said weight-pan the hook $m$ on one of the arms of lever M will be brought into engagement with the lug N and thus lock the receiver B against tilting and discharging its load, said hook-arm following the downward movement of the receiver and scale-beam under the action of the stud $b'$. It is obvious, therefore, that by a proper adjustment of the weight $m'$ on lever M the hook-arm of the latter can be held in such a position as not to be brought into engagement with the lug N by the normal balancing oscillations of the receiver and scale-beam. On the other hand, the weight $m'$ on lever M may be utilized to counteract these normal oscillations of the scale-beam A—that is to say, the scale-beam will be prevented from oscillating as soon as the load in receiver B balances the weight on the scale-pan C by so adjusting the weight $m'$ that the stud $b'$ will bear on the hook-arm of lever M when the scale-beam lies in a horizontal or balanced plane, as will be readily understood. It will thus be seen that the weighted lever M performs the function of a yielding abutment adapted to limit the downward oscillation of the scale-beam under a load corresponding with that of the weight to be balanced without interfering with the downward movement of such beam under a load greater than the one to be balanced.

In order that the gate G may be prevented from opening accidentally or being opened designedly during the discharge of the material from the receiver, I provide the latter with a stud or pin L and the gate G with an arm R projecting into the path of said pin, Fig. 2, so that when the receiver B tilts to discharge its contents said stud L will impinge on the arm R and lock the same, and therethrough the gate G, against motion, as shown in Fig. 1. In Fig. 3 I have shown this part of my invention in its application to scales in which the receiver B' is a non-tilting one and is provided with a tilting discharge-gate K, to which is secured an arm N', the outer or free end of which is adapted to be engaged by the hook $m$ of lever M whenever the said receiver is overcharged, and said lever M is depressed by the stud $b'$ under an increasing downward movement of the receiver, the gate K being weighted, as usual, to keep the same closed during the charging of the receiver and is tilted in a well-known manner to open the same after the charge is weighed. In said Fig. 3 I have also shown means whereby the gate is locked closed after the delivery-gate K is released and opens under the weight of the load in the receiver B', said means consisting, as above set forth, of an arm R on aforesaid gate G, extending into the path of a stud or pin L' at the weighted end K' of the gate K, the latter being thus locked in its closed position during the discharge of the receiver.

Other means may be provided to lock a tilting receiver against tilting over to discharge its contents, as, for instance, a fixed catch $m^2$, adapted to engage a lug $N^2$ on the receptacle B, as shown in Figs. 4 and 5, in combination with a yielding abutment for limiting the downward movement of the receiver under a load equal to the one to be balanced thereby, as a spring M', Fig. 4, or a weight $M^2$, Fig. 5, the tension of the former being so adjusted and the weight of the latter such as to limit the downward movement of the receiver B, as, for instance, when it counterbalances the weight on the beam. If, however, the receptacle is overcharged, the spring M' or weight $M^2$ will yield, thereby allowing the receiver B to descend into position for engagement with the catch-hook $m^2$, whereby said receiver is locked against tilting and emptying its contents. To this end I provide the weight-pan C with a yoke $c'$, and to the frame of the scales I secure a cross-bar $p^2$, encompassed by said yoke, the spring M', Fig. 4, being secured to the under side of such cross-bar; or, if a ponderous body or weight $M^2$ is used, said body is loosely seated in an opening formed in a cross-bar $p'$ and projects from the under side of the latter, so that as the weight-pan rises its yoke $c'$ will come in contact either with the spring M' or the weight $M^2$, according as the one or the other is used, thereby limiting the upward movement of the scale-pan and consequently the oscillations of the scale-beam.

Having thus described my invention, what I claim as new therein, and desire to secure by Letters Patent, is—

1. In a weighing apparatus of the class described, the combination with the scale-beam and a receiver adapted to automatically tilt and discharge its contents under a predetermined or given load; of a locking device operating automatically to lock the receiver against tilting when the downward movement thereof under a load greater than the weight to be balanced thereby exceeds the normal or balancing downward movement of such receiver, for the purpose set forth.

2. In a weighing apparatus of the class described, the combination with the scale-beam and a receiver adapted to automatically tilt and discharge its contents under a predetermined or given load; of a locking device brought into operation by the downward movement of said receiver and operating automatically to lock the same against tilting when the downward movement thereof under a load greater than the weight to be balanced thereby exceeds the normal or balancing downward movement of such receiver, for the purpose set forth.

3. In a weighing apparatus of the class described, the combination with the scale-beam and a receiver adapted to automatically tilt and discharge its contents under a predetermined or given load; of a locking device operating automatically to lock the receiver against tilting when the downward movement thereof under a load greater than the weight to be balanced thereby exceeds the normal or balancing downward movement of such receiver, and a yielding abutment operating on the scale-beam to limit its downward movement under a normal or balanced load, for the purpose set forth.

4. In a weighing apparatus of the class described, the combination with the feed-hopper and an automatically-operating gate controlling the delivery-port of said hopper, said gate provided with a depending arm R rigidly secured thereto; of the tilting receiver B provided with a stud L adapted to engage the arm R after the gate has closed the delivery-port of the feed-hopper and lock said gate against movement, substantially as and for the purpose set forth.

In testimony that I claim the foregoing as my invention I have signed my name, in presence of two witnesses, this 31st day of January, 1894.

MICHAEL EDUARD REISERT.

Witnesses:
FRITZ SCHRÖDER,
SOPHIE NAGEL.